(12) United States Patent
Nagaraja

(10) Patent No.: US 12,265,505 B2
(45) Date of Patent: Apr. 1, 2025

(54) SYSTEMS AND METHODS FOR AUTOMATED REPORTING

(71) Applicant: The Toronto-Dominion Bank, Toronto (CA)

(72) Inventor: Sanjay Nagaraja, Woodbridge, NJ (US)

(73) Assignee: The Toronto-Dominion Bank, Toronto (CA)

( * ) Notice: Subject to any disclaimer, the term of this patent is extended or adjusted under 35 U.S.C. 154(b) by 120 days.

(21) Appl. No.: 18/102,223

(22) Filed: Jan. 27, 2023

(65) Prior Publication Data
US 2024/0256492 A1 Aug. 1, 2024

(51) Int. Cl.
*G06F 16/25* (2019.01)
*G06F 16/176* (2019.01)
*G06F 16/21* (2019.01)
*G06F 16/215* (2019.01)

(52) U.S. Cl.
CPC .......... *G06F 16/176* (2019.01); *G06F 16/215* (2019.01); *G06F 16/219* (2019.01); *G06F 16/25* (2019.01)

(58) Field of Classification Search
CPC ...... G06F 16/215; G06F 16/219; G06F 16/25; G06F 16/21
See application file for complete search history.

(56) References Cited

U.S. PATENT DOCUMENTS

| | | | |
|---|---|---|---|
| 8,330,931 B2 | 12/2012 | Coles | |
| 9,418,070 B2 | 8/2016 | Laron | |
| 10,839,389 B1* | 11/2020 | Cron, Jr. | ............. G06Q 10/087 |
| 10,901,981 B2 | 1/2021 | Prasanna | |
| 11,321,309 B2 | 5/2022 | Grabs | |
| 11,409,764 B2 | 8/2022 | Rehal | |
| 11,461,294 B2* | 10/2022 | Soza | ..................... G06F 16/235 |
| 2015/0088815 A1* | 3/2015 | Billapati | ................. G06F 16/21 |
| | | | 707/609 |

* cited by examiner

*Primary Examiner* — Maher N Algibhah
(74) *Attorney, Agent, or Firm* — Nixon Peabody LLP

(57) ABSTRACT

Computer-implemented systems and methods for processing data for automated consolidation of adjustments to data drawn from one or more databases. The systems receive first source data along with adjustments to the first source data, which is used to generate adjusted first source data. Second source data is also received, along with a delta file, which is applied to generate adjusted second source data. The adjust first and second source data is then compiled, and third adjustments to the compiled data may be performed.

19 Claims, 7 Drawing Sheets

SYSTEMS AND METHODS FOR AUTOMATED REPORTING

TECHNICAL FIELD

The disclosed exemplary embodiments relate to computer-implemented systems and methods for processing data and, in particular, to systems and methods for automated consolidation of adjustments to data.

BACKGROUND

In certain institutions that are subject to reporting requirements, there may be a need to generate operational reports on a regular, periodic basis (e.g., daily). In many cases, these reports are mostly automated, but cannot be fully automated for various reasons. That is, the data from which the reports are generated are manually reviewed and updated by humans, typically in the form of spreadsheets with manual comments and revisions. This process can be both laborious and time consuming, and may involve multiple "back and forth" iterations as one set of reviewers verify with another set. At the same time, while the oversight and revision process is intended to correct errors or inaccuracies in the data, the manual nature of the process means that it may itself introduce additional errors. Finally, because these reports often draw from multiple sources, some of which may depend on "upstream" reports, each instance of manual revision further slows the reporting process while introducing additional sources of error, as the downstream revision process takes into account different versions of data, sometimes with conflicting information.

SUMMARY

The following summary is intended to introduce the reader to various aspects of the detailed description, but not to define or delimit any invention.

In at least one broad aspect, there is provided a system for automatic, high-volume report generation from a plurality of sources, the system comprising: a database system comprising at least a first database and a second database, wherein the first database stores first source data and the second database stores second source data; a computer operatively coupled to the database system, the computer having a memory and a processor configured to: receive first adjustments to the first source data; retrieve adjusted first source data from the first database; receive a delta file comprising second adjustments from the user for application to the second source data; retrieve adjusted second source data from the second database; compile the adjusted first source data and the adjusted second source data to generate candidate report data; receive third adjustments to the candidate report data; generate the report data based on the adjusted candidate report data; and transmit the generated report data.

In some cases, the first adjustments comprise manual adjustments that are stored separately.

In some cases, the first adjustments are applied to the first source data when the report data is generated.

In some cases, the first adjustments are in the form of at least one of parked, posted, and original adjustments.

In some cases, the memory and the processor are further configured to query the first database for metadata indicative of an adjustment.

In some cases, the metadata indicates a status of the first adjustments.

In some cases, the first adjustments, second adjustments, and third adjustments are provided in a history report with the generated report data.

In some cases, the generated report data is stored in at least one of an offline repository and an online repository.

In some cases, at least one of the first and third adjustments are received from a user.

In another broad aspect, there is provided a method for automatic, high-volume report generation from a plurality of sources, the method comprising: retrieving first source data from a first database; retrieving first adjustments to the first source data from the first database; determining final adjustments to the first source data from the first adjustments; generating adjusted first source data by applying the final adjustments to the first source data; retrieving second source data from a second source; retrieving a delta file and applying the delta file to the second source data to generate adjusted second source data; compiling the adjusted first source data and the adjusted second source data to generate candidate report data; determining third adjustments to the candidate report data; and applying the third adjustments to generate the report data.

In some cases, the method further comprises providing a history report with the report data, the history report identifying the first adjustments, the second adjustments and the third adjustments.

In some cases, retrieving the first adjustments comprises querying the first database for metadata indicative of an adjustment.

In some cases, the metadata indicates a status of the first adjustments.

In some cases, the method further comprises storing the first adjustments separately.

In some cases, the method further comprises applying the first adjustments to the first source data when the report data is generated.

In some cases, the first adjustments are in the form of at least one of parked, posted, and original.

In some cases, the method further comprises storing the generated report data in at least one of an offline repository and an online repository.

In some cases, the method further comprises transmitting the generated report data to a user.

According to some aspects, the present disclosure provides a non-transitory computer-readable medium storing computer-executable instructions. The computer-executable instructions, when executed, configure a processor to perform any of the methods described herein.

BRIEF DESCRIPTION OF THE DRAWINGS

The drawings included herewith are for illustrating various examples of articles, methods, and systems of the present specification and are not intended to limit the scope of what is taught in any way. In the drawings.

DETAILED DESCRIPTION

Figure 1:
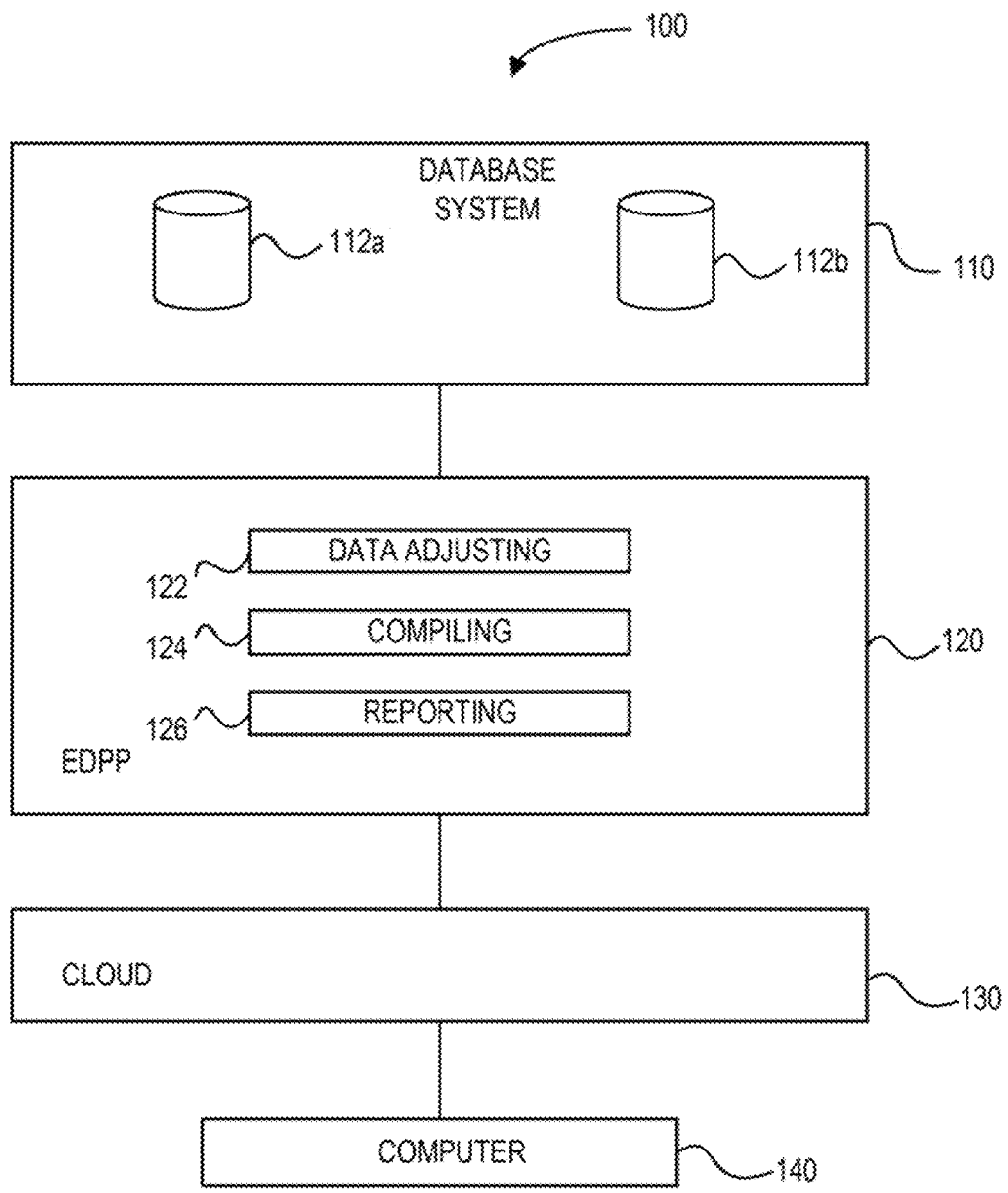
FIG. 1 is a schematic block diagram of an exemplary system for automatic, high-volume report generation from a plurality of sources in accordance with at least some embodiments.

Many organizations possess and maintain confidential data regarding their operations. For instance, some organizations may have confidential data concerning industrial formulas and processes. Other organizations may have confidential data concerning customers and their interactions with those customers. In a large organization, this confidential data may be stored in a variety of databases, which may have different, sometimes incompatible schemas, fields and compositions. A sufficiently large organization may have hundreds of millions of records across these various databases, corresponding to tens of thousands, hundreds of thousands or even millions of customers. Accordingly, it may be desirable to periodically generate reports concerning the data. These reports may be automated in some instances, however in many cases manual adjustments of report data may be desired or even required.

In particular, there may be various different data adjustments applied to data in an organization, and reports may consolidate outputs of different types of adjustments made with a system. For example, three such types of adjustment are pencil adjustments, stitching or merging adjustments, and top-side adjustments.

Pencil adjustments are adjustments made to data drawn from source services (e.g., a wholesale database platform). Data is loaded into data sources (tables) and, at this stage, end users can identify the desired manual adjustments to the data in the tables. However, for reporting purposes, the original data cannot be modified directly. Rather, pencil adjustments are stored separately and applied when generating the reporting data. Pencil adjustments to data may be challenging to implement, since it first involves locating where data adjustments are stored and often end users may store their adjustments in non-standard locations. Pencil adjustments can also be in one of several forms: parked, posted, or original. Original implies that the data is original. Posted means that a change has been proposed by a first reviewer but not yet approved. Parked means that a posted change has been approved by a second reviewer. Only original or parked adjustments should be propagated forward. The full history of the adjustments (or the lack thereof) is propagated forward.

In some cases, identifying the adjustments and their status may involve using SQL queries to retrieve metadata regarding the data to be adjusted and any revisions. The described systems and methods then determine which is the latest record that can be used for reporting purposes, as opposed to interim records or original records.

Stitching and merging adjustments are used to systematically access and pull manual adjustments uploaded by the users. For example, rather than directly editing data in tables, users may upload their own data (e.g., because it is known to be more accurate, or because it contains necessary bulk adjustments), which is then merged with or overlaid on the existing data. The uploaded data may be a "delta" to the original data. Typically, stitching and merging operations are not posted/parked, but applied immediately.

Top-side adjustments are used to provide final adjustments to the reporting data, e.g., because new or more accurate information is available. These may be conceptually similar to pencil adjustments, but occur at a later stage.

The described embodiments generally provide for an automated approach for consolidation of pencil adjustments, stitching/merging and top-side adjustments to automated reports that previously involved manual coordination and data entry. The automated approach provides access, retrieval, and display of a consolidated output of all adjustments made within the system. The automated approach can be performed using a computing cluster optimized for such processing, along with security and access provisioning. The output can be in the form of multi-format reports, either within the system or provided offline, and can be transmitted in an automated manner via email to the desired recipients.

In at least some embodiments, the described systems and methods integrate and wrap all of the above into an automated workflow, which can automate reporting and produce outputs in the desired formats (e.g., Excel, PDF, CSV, etc.), and transmit the reports to the desired recipients.

Referring now to FIG. 1, there is illustrated a block diagram of an example computing system, in accordance with at least some embodiments. Computing system 100 has a database system 110, an enterprise data provisioning platform (EDPP) 120 operatively coupled to the source database system 110, a cloud-based computer 130 that is operatively coupled to the EDPP 120, and an end node or computer 140.

The database system 110 has at least two databases 112a, 112b. Each of the databases 112a, 112b of source database system 110 contain respective source data. One or more export modules may periodically (e.g., daily, weekly, monthly, etc.) export data from the databases 112 to EDP 120. In some cases, the export data may be exported in the form of comma separated value (CSV) data, however other formats may also be used.

The EDPP 120, which may also be referred to as a publishing server, receives source data exported by the database system 110, processes it and exports the processed data to the cloud-based computer 130, and may be access by end node computer 140 which is connected to the cloud-based computer 130. The EDPP 120 may perform extract, transform and load (ETL) operations on the received source data. The EDPP 120 may also have, for example, a data adjusting module 122, a compiling module 124, and a reporting module 126.

The data adjusting module 122 receives source data extracted from one database 112a, and pencil adjustments also extracted from the database 112a. The data adjusting module 122 adjusts the source data from the database 112a based on the extracted pencil adjustments. The data adjusting module 122 receives source data extracted from the database 112b, and retrieves a delta file containing adjustments for the source data extracted from the database 112b. The data adjusting module 122 adjusts the source data from the database 112b based on the retrieved delta file.

A user inputs their pencil adjustments which are stored in the database 112a. These comprise adjustments that are marked as parked and posted, identifying the adjustments as either proposed adjustments or approved adjustments respectively. The adjustment history is included with the final report data, outlining the adjustment or revision history for the data.

A user may also input manual adjustments, whereby new data is uploaded and overlaid on the existing data. This new data may be uploaded to the database 112b. As the new data is different to the original data, it is a delta to the original. The uploaded new data may be identified as a delta file. The delta file enables the creation of an adjustment history, outlining the adjustments made to the original data, which is included with the final report data.

The compiling module 124 compiles the adjusted source data from database 112a with the adjusted source data from database 112b to create candidate report data. The candidate report data is subject to further top-side adjustments. The data adjusting module 122 applied the adjustments to the candidate report data.

In some cases, adjustments may be stored in another location (i.e., other than database 112a or 112b). For instance, adjustment data may be stored in a separate database (not shown) maintained by the EDPP 120 or in the cloud 130.

The user inputs the top-side adjustments, which are similar to pencil adjustments, but applied at a later stage, i.e., applied to the compiled candidate report data. Similar to the pencil adjustments, the top-side adjustments comprise adjustments that are marked as parked and posted, identifying the adjustments as either proposed adjustments or approved adjustments respectively. The adjustment history is included with the final report data, outlining the adjustment or revision history for the data.

The reporting module 126 generates the report data that contains all of the pencil adjustments, delta file adjustments (or stitching/merging adjustments), and top-side adjustments. This is exported to the cloud-based computer 130 for transmission to the appropriate end users via the end node computer 140.

Figure 2:
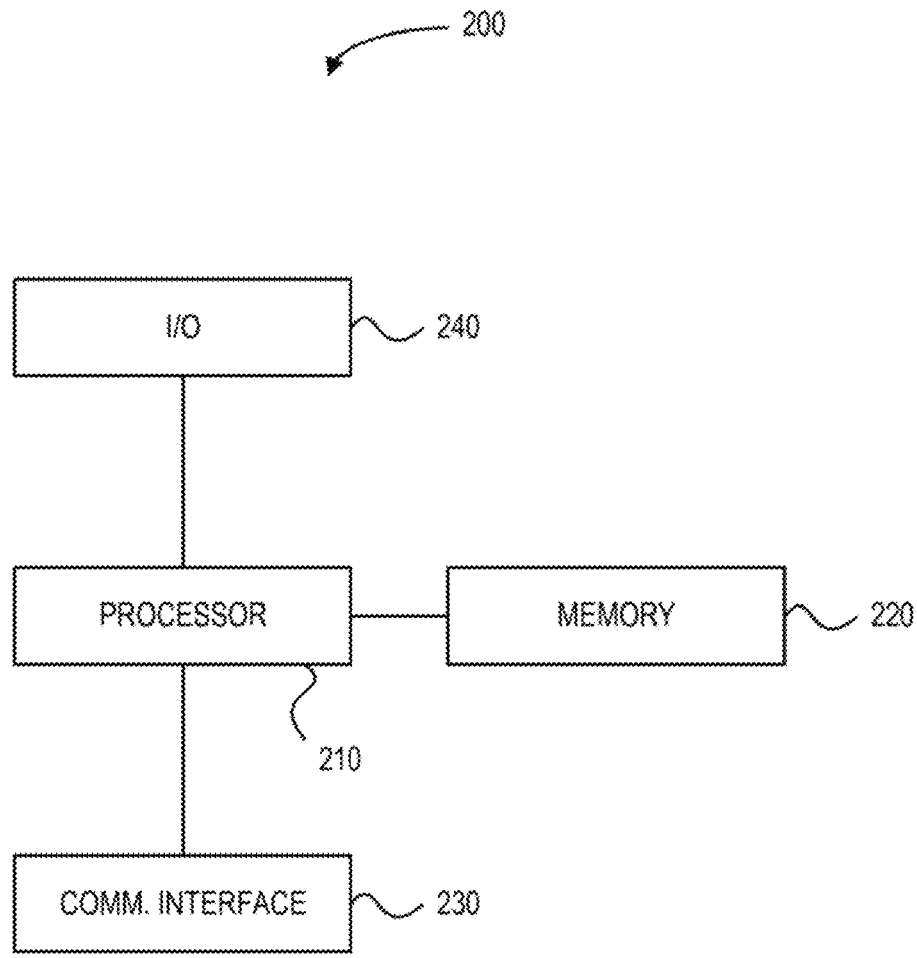
FIG. 2 is a block diagram of a computer in accordance with at least some embodiments.

Referring now to FIG. 2, there is illustrated a simplified block diagram of a computer in accordance with at least some embodiments. Computer 200 is an example implementation of a computer such as database system 110, EDPP 120, cloud-based computer 130, and end node computer 140. Computer 200 has at least one processor 210 operatively coupled to at least one memory 220, at least one communications interface 230, at least one input/output device 240.

The at least one memory 220 includes a volatile memory that stores instructions executed or executable by processor 210, and input and output data used or generated during execution of the instructions. Memory 220 may also include non-volatile memory used to store input and/or output data—e.g., within a database—along with program code containing executable instructions.

Processor 210 may transmit or receive data via communications interface 230, and may also transmit or receive data via any additional input/output device 240 as appropriate.

In some implementations, computer 200 may be batch processing system that is generally designed and optimized to run a large volume of operations at once, and are typically used to perform high-volume, repetitive tasks that do not involve real-time interactive input or output. The database system 110 may be one such example. Conversely, some implementations of computer 200 may be interactive systems that accept input (e.g., commands and data) and produce output in real-time. In contrast to batch processing systems, interactive systems generally are designed and optimized to perform small, discrete tasks as quickly as possible, although in some cases they may also be tasked with performing long-running computations similar to batch processing tasks.

Figure 3:
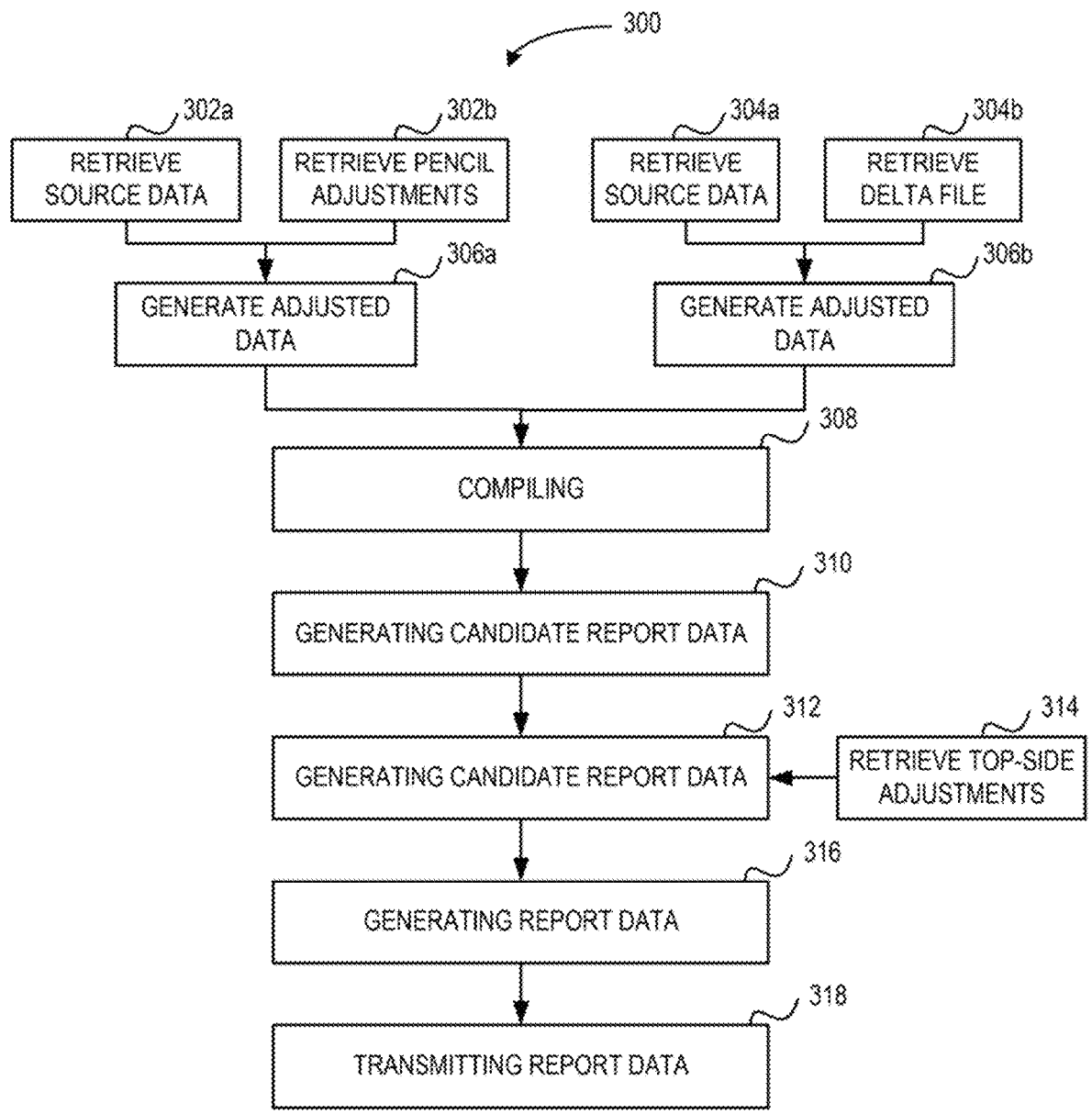
FIG. 3 is a flowchart diagram of an example method of automatic, high-volume report generation from a plurality of sources.

Referring now to FIG. 3, there is illustrated a flowchart diagram of an example method for automatic, high-volume report generation from a plurality of sources in accordance with at least some embodiments. Method 300 may be carried out, e.g., by system 100 of FIG. 1.

Method 300 begins with step 302a by retrieving a first set of source data from a database, such as from database 112a. The first set of source data is subject to pencil adjustments, inputted by a user at a computer 140, to the database 112a. At step 302b the pencil adjustments are retrieved from the database 112a.

At step 306a, the first set of source data extracted in step 302a is adjusted according to the pencil adjustments extracted at step 302b. This creates a first set of adjusted data. The adjusting may take place in a module of the EDPP 120 such as the data adjusting module 122.

Steps 304a and 304b may be performed simultaneously with steps 302a and 302b, or at a different time. At step 304a a second set of source data is extracted from a database, such as database 112b. Database 112b is a different database from database 112a. The second set of source data is subject to stitching or merging adjustments, inputted by a user at a computer 140. The adjustments are captured in a delta file which is retrieved at step 304b.

At step 306b, the second set of source data extracted in step 304a is adjusted according to the delta file extracted in step 304b. This creates a second set of adjusted data. The adjusting may take place in a module of the EDPP 120 such as the data adjusting module 122.

At step 308 the first set of adjusted data from step 306a and the second set of adjusted data from step 306b are compiled to create candidate report data. The compiling may take place in a module of EDPP 120 such as the compiling module 124. The candidate report data is an initial data report containing the combination of the first and second sets of adjusted data.

The candidate report data is then subject to top-side adjustments. The top-side adjustments may be stored in system 110, EDPP 120, or in cloud 130. At step 314 top-side adjustments, inputted by a user at a computer 140, are retrieved. The top-side adjustments are applied to the candidate report data to create the final data report. The application of the top-side adjustments may take place in a module of the EDPP 120 such as the adjusting and reporting module 126.

At step 318 the final report data is transmitted to the appropriate end users via email or similar. The final report data may also be stored in both online and offline repositories.

Figure 4A:
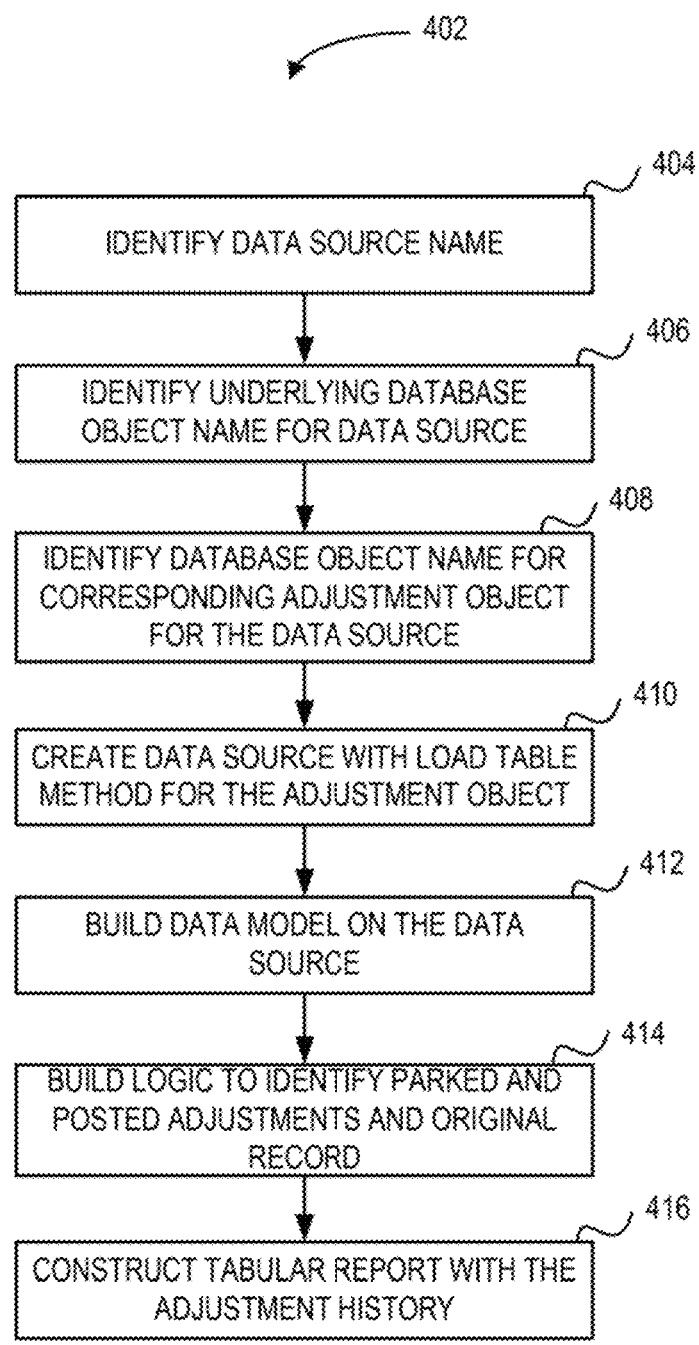
FIG. 4A is a flowchart diagram of a subprocess of the method illustrated in FIG. 3.

In FIGS. 4A to 4D a number of the steps of the method 300 are further illustrated. Referring to FIG. 4A, process 402 outlines retrieving pencil adjustments in step 302b. At step 404 the data source name is identified. At step 406 the underlying database object name for the data source is identified. At step 408 the database object name for the corresponding adjustment object is identified. At step 410 a data source is created with a load table method for the adjustment object. At step 412 a data model for the data source is built. At step 414 logic to identify the parked and posted adjustments, as well as the original data, is built. At step 416 the report containing the adjustment history is generated. This provides the history report relating to the pencil adjustments for the first set of adjusted data.

As the pencil adjustments are stored separately, the data source being adjusted is identified, as are the specific data objects within the data source being adjusted. Corresponding adjustment objects are also identified to ensure the adjustments are applied to the appropriate data objects. The adjusted data is then compiled into a report along with an adjustment history.

Figure 4B:
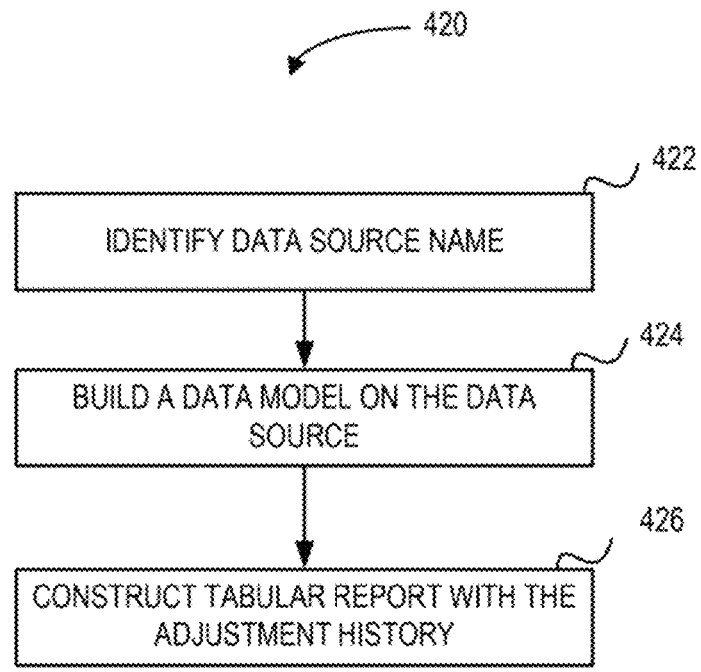
FIG. 4B is another flowchart diagram of a subprocess of the method illustrated in FIG. 3.

Referring to FIG. 4B, process 420 outlines retrieving stitching or merging adjustments made as a result of an inputted delta file such as in step 304b. In step 422 a data source name is identified. In step 424 a data model for the data source is built. In step 426 the report containing the adjustment history is generated. This provides the history report relating to the stitching or merging adjustments made as a result of the delta file for the second set of adjusted data.

As the adjustments that are made based on inputted manual adjustments uploaded as new data, or a delta file, it is necessary to identify the data source that the adjustments are applied to. The adjusted data is then compiled into a report along with an adjustment history that is based on the delta file.

Figure 4C:
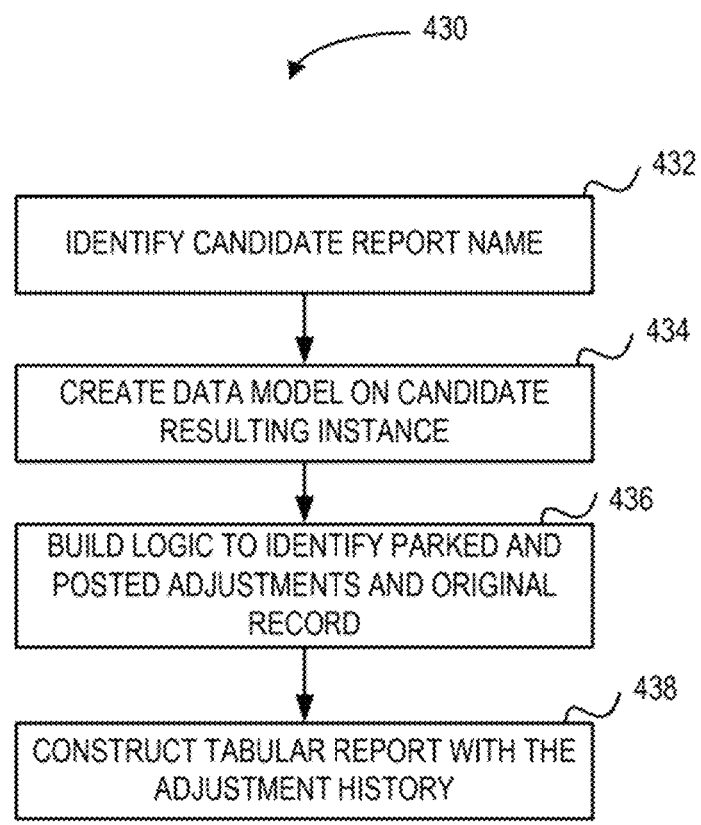
FIG. 4C is another flowchart diagram of a subprocess of the method illustrated in FIG. 3.

Referring to FIG. 4C, progress 430 outlines retrieving top-side adjustments such as in step 314. In step 432 the candidate report name is identified. At step 434, a data model is created on the candidate resulting instance. At step 436, logic to identify the parked and posted adjustments, as well as the original data, is built. At step 438, the report containing the adjustment history is generated. This provides the history report relating to the top-side adjustments made to the candidate report data. A compiled history report containing the information pertaining to the pencil, stitching or merging, and top-side adjustments is be transmitted along with the final report data.

The top-side adjustments are conceptually similar to the pencil adjustments described in process 402. As the top-side adjustments are applied to the candidate report data, which is the compiled first and second sets of adjusted data, it is necessary to identify the candidate report data. Corresponding adjustment objects are also identified to ensure the adjustments are applied to the appropriate data objects. The adjusted data is then compiled into a report along with an adjustment history.

Figure 4D:
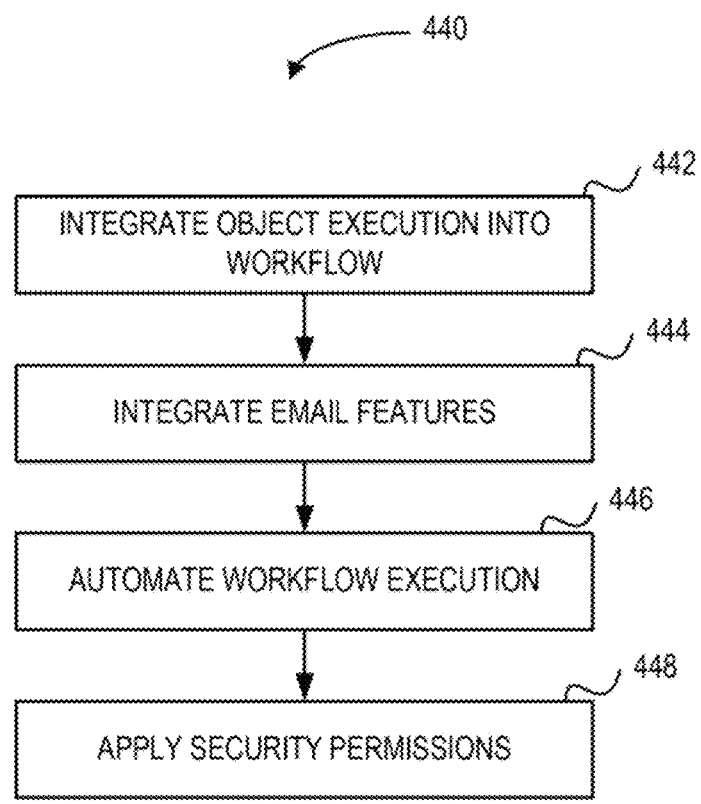
FIG. 4D is another flowchart diagram of a subprocess of the method illustrated in FIG. 3.

Referring to FIG. 4D, process 440 integrates method 300 into an automated workflow. At step 442 object execution is integrated into the workflow. At step 444 email features are integrated. At step 446 the workflow execution is automated. At step 448 security permissions are applied, if appropriate. Security permissions may be required depending on the nature of the data being processed, confidentiality or other regulatory requirements. This results in an automated high-volume report generation method, with data being pulled from a plurality of sources. The method may be automated by the cloud-based computer 130 or by EDPP 120 or system 110.

Advantages of such as system and method include a reduction in time and manual effort. Moreover, the use of an automated system and method as described in the embodiments disclosed herein may reduce the risk of introducing errors via manual adjustments.

Although the embodiments described above extract data from two databases 112a, 112b, the described system and method is applicable for extracting data from more than two databases and serves as an illustration of extracting and compiling data from more than one data source.

The various systems or processes described enable: systematic access to and pulling of pencil adjustments at the input source data source levels for either single or multiple data sources; systematic access to and pulling of manual adjustments uploaded by users into a stitching or merging approach in dedicated adjustment data sources; systemic access to and pulling of top-side adjustments at the final reporting layers; systematic integration of the before and after adjustment governance reporting into a consolidated report; integration into an automated workflow; providing the output reports in spreadsheet, Portable Document Format (PDF), comma-separated value (CSV) or other formats, automating transmission of the output reports to appropriate users via email technology or similar, and storing of the output reports in an online and/or offline repositories.

Various systems or processes have been described to provide examples of embodiments of the claimed subject matter. No such example embodiment described limits any claim and any claim may cover processes or systems that differ from those described. The claims are not limited to systems or processes having all the features of any one system or process described above or to features common to multiple or all the systems or processes described above. It is possible that a system or process described above is not an embodiment of any exclusive right granted by issuance of this patent application. Any subject matter described above and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

For simplicity and clarity of illustration, reference numerals may be repeated among the figures to indicate corresponding or analogous elements. In addition, numerous specific details are set forth to provide a thorough understanding of the subject matter described herein. However, it will be understood by those of ordinary skill in the art that the subject matter described herein may be practiced without these specific details. In other instances, well-known methods, procedures, and components have not been described in detail so as not to obscure the subject matter described herein.

The terms "coupled" or "coupling" as used herein can have several different meanings depending in the context in which these terms are used. For example, the terms coupled or coupling can have a mechanical, electrical or communicative connotation. For example, as used herein, the terms coupled or coupling can indicate that two elements or devices are directly connected to one another or connected to one another through one or more intermediate elements or devices via an electrical element, electrical signal, or a mechanical element depending on the particular context. Furthermore, the term "operatively coupled" may be used to indicate that an element or device can electrically, optically, or wirelessly send data to another element or device as well as receive data from another element or device.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Terms of degree such as "substantially", "about", and "approximately" as used herein mean a reasonable amount of deviation of the modified term such that the result is not significantly changed. These terms of degree may also be construed as including a deviation of the modified term if this deviation would not negate the meaning of the term it modifies.

Any recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the result is not significantly changed.

Some elements herein may be identified by a part number, which is composed of a base number followed by an alphabetical or subscript-numerical suffix (e.g. 112*a*, or 1121). All elements with a common base number may be referred to collectively or generically using the base number without a suffix (e.g. 112).

The systems and methods described herein may be implemented as a combination of hardware or software. In some cases, the systems and methods described herein may be implemented, at least in part, by using one or more computer programs, executing on one or more programmable devices including at least one processing element, and a data storage element (including volatile and non-volatile memory and/or storage elements). These systems may also have at least one input device (e.g. a pushbutton keyboard, mouse, a touchscreen, and the like), and at least one output device (e.g. a display screen, a printer, a wireless radio, and the like) depending on the nature of the device. Further, in some examples, one or more of the systems and methods described herein may be implemented in or as part of a distributed or cloud-based computing system having multiple computing components distributed across a computing network. For example, the distributed or cloud-based computing system may correspond to a private distributed or cloud-based computing cluster that is associated with an organization. Additionally, or alternatively, the distributed or cloud-based computing system be a publicly accessible, distributed or cloud-based computing cluster, such as a computing cluster maintained by Microsoft Azure™, Amazon Web Services™, Google Cloud™, or another third-party provider. In some instances, the distributed computing components of the distributed or cloud-based computing system may be configured to implement one or more parallelized, fault-tolerant distributed computing and analytical processes, such as processes provisioned by an Apache Spark™ distributed, cluster-computing framework or a Databricks™ analytical platform. Further, and in addition to the CPUs described herein, the distributed computing components may also include one or more graphics processing units (GPUs) capable of processing thousands of operations (e.g., vector operations) in a single clock cycle, and additionally, or alternatively, one or more tensor processing units (TPUs) capable of processing hundreds of thousands of operations (e.g., matrix operations) in a single clock cycle.

Some elements that are used to implement at least part of the systems, methods, and devices described herein may be implemented via software that is written in a high-level procedural language such as object-oriented programming language. Accordingly, the program code may be written in any suitable programming language such as Python or Java, for example. Alternatively, or in addition thereto, some of these elements implemented via software may be written in assembly language, machine language or firmware as needed. In either case, the language may be a compiled or interpreted language.

At least some of these software programs may be stored on a storage media (e.g., a computer readable medium such as, but not limited to, read-only memory, magnetic disk, optical disc) or a device that is readable by a general or special purpose programmable device. The software program code, when read by the programmable device, configures the programmable device to operate in a new, specific, and predefined manner to perform at least one of the methods described herein.

Furthermore, at least some of the programs associated with the systems and methods described herein may be capable of being distributed in a computer program product including a computer readable medium that bears computer usable instructions for one or more processors. The medium may be provided in various forms, including non-transitory forms such as, but not limited to, one or more diskettes, compact disks, tapes, chips, and magnetic and electronic storage. Alternatively, the medium may be transitory in nature such as, but not limited to, wire-line transmissions, satellite transmissions, internet transmissions (e.g., downloads), media, digital and analog signals, and the like. The computer usable instructions may also be in various formats, including compiled and non-compiled code.

While the above description provides examples of one or more processes or systems, it will be appreciated that other processes or systems may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be revisited.

I claim:

1. A system for automatic, high-volume report generation from a plurality of sources, the system comprising:
   a database system comprising at least a first database and a second database, wherein the first database stores first source data and the second database stores second source data;
   a computer operatively coupled to the database system, the computer having a memory and a processor configured to:
      retrieve, using a SQL query, first adjustments to the first source data, wherein the first adjustments comprise metadata identifying one or more component of the first source data and one or more revisions to the one or more component;
      retrieve first source data from the first database;
      determine, based on the metadata, final adjustments to the first source data from the first adjustments;
      generate adjusted first source data by applying the final adjustments to the first source data using the metadata;
      receive a delta file comprising second adjustments from a user for application to the second source data;
      retrieve adjusted second source data from the second database;
      compile the adjusted first source data and the adjusted second source data to generate candidate report data;
      receive third adjustments to the candidate report data;
      generate the report data based on the adjusted candidate report data; and
      transmit the generated report data.

2. The system of claim 1, wherein the first adjustments comprise manual adjustments.

3. The system of claim 2, wherein the first source data remains unmodified in the first database when the report data is generated.

4. The system of claim 1, wherein the first adjustments are in the form of at least one of parked, posted, and original adjustments.

5. The system of claim 1, wherein the SQL query is transmitted to the first database.

6. The system of claim 1, wherein the metadata indicates a status of the first adjustments.

7. The system of claim 1, wherein the first adjustments, second adjustments, and third adjustments are provided in a history report with the generated report data.

8. The system of claim 1, wherein the generated report data is stored in at least one of an offline repository and an online repository.

9. The system of claim 1, wherein at least one of the first and third adjustments are received from a user.

10. A method for automatic, high-volume report generation from a plurality of sources, the method comprising:
    retrieving first source data from a first database;
    retrieving, using a SQL query, first adjustments to the first source data from the first database, wherein the first adjustments comprise metadata identifying one or more component of the first source data and one or more revisions to the one or more component;
    determining, based on the metadata, final adjustments to the first source data from the first adjustments;
    generating adjusted first source data by applying the final adjustments to the first source data using the metadata;
    retrieving second source data from a second source;
    retrieving a delta file and applying the delta file to the second source data to generate adjusted second source data;
    compiling the adjusted first source data and the adjusted second source data to generate candidate report data;
    determining third adjustments to the candidate report data; and
    applying the third adjustments to generate the report data.

11. The method of claim 10, further comprising providing a history report with the report data, the history report identifying the first adjustments, the second adjustments and the third adjustments.

12. The method of claim 10, wherein retrieving the first adjustments comprises querying the first database.

13. The method of claim 10, wherein the metadata indicates a status of the first adjustments.

14. The method of claim 10, wherein the first adjustments comprise manual adjustments.

15. The method of claim 10, wherein the first source data remains unmodified in the first database when the report data is generated.

16. The method of claim 10, wherein the first adjustments are in the form of at least one of parked, posted, and original.

17. The method of claim 10, further comprising storing the generated report data in at least one of an offline repository and an online repository.

18. The method of claim 10, further comprising transmitting the generated report data to a user.

19. A non-transitory computer readable medium storing computer executable instructions which, when executed by at least one computer processor, cause the at least one computer processor to carry out a method for automatic, high-volume report generation from a plurality of sources, the method comprising:
    retrieving first source data from a first database;
    retrieving, using a SQL query, first adjustments to the first source data from the first database, wherein the first adjustments comprise metadata identifying one or more component of the first source data and one or more revisions to the one or more component;
    determining, based on the metadata, final adjustments to the first source data from the first adjustments;
    generating adjusted first source data by applying the final adjustments to the first source data using the metadata;
    retrieving second source data from a second source;
    retrieving a delta file and applying the delta file to the second source data to generate adjusted second source data;
    compiling the adjusted first source data and the adjusted second source data to generate candidate report data;
    determining third adjustments to the candidate report data; and
    applying the third adjustments to generate the report data.

* * * * *